May 29, 1962 N. F. LOCKHART 3,037,197

MAGNETIC EQUALS CIRCUIT

Filed Dec. 19, 1957 2 Sheets-Sheet 1

INVENTOR.
NEWTON F. LOCKHART
BY
William V. Schelberg
AGENT

May 29, 1962 N. F. LOCKHART 3,037,197

MAGNETIC EQUALS CIRCUIT

Filed Dec. 19, 1957 2 Sheets-Sheet 2

3,037,197

MAGNETIC EQUALS CIRCUIT

Newton F. Lockhart, Wappingers Falls, N.Y., assignor to International Business Machines Corporation, New York, N.Y., a corporation of New York Filed Dec. 19, 1957, Ser. No. 703,939
9 Claims. (Cl. 340—174)

This invention relates to binary switching circuits and more particularly to a logical switching circuit employing magnetic cores adapted to perform the function of equals which does not require the use of diodes.

Magnetic cores exhibiting a substantially rectangular hysteresis characteristic have been found useful in constructing various logical devices, and one embodiment illustrating how two such cores may be utilized in combination to allow discrimination of input information is described and claimed in a copending application Serial No. 629,131, filed October 24, 1957, on behalf of John A. Kauffman, which is assigned to the assignee of this application. An improvement in logical circuitry wherein two such cores are uniquely pulsed to provide comparison of input information is demonstrated in one embodiment of this invention which is directed to a two-way equals circuit. In this respect, a two-way equals circuit may be defined as a circuit having two input terminals and one output at which a signal is produced when either none or both input terminals receive an input signal coincidently in time.

In accordance with this invention, two magnetic storage cores are provided each having a control winding means which are serially connected with one another. A further winding is provided on each core adapted to switch a first of the cores to a first limiting residual state and the remaining core to a second limiting residual state. Depending upon the state of residual flux density in each of the cores, upon energization of these latter windings, an output will be induced in each of the control windings which outputs oppose and tend to cancel one another. In effect the flux density of each core is compared and the output is dependent upon the state of remanent flux density in each core, which output may be uniquely utilized in logical devices.

Accordingly, an object of this invention is to provide a new and improved arrangement for switching circuits.

Another object of this invention is to provide a new and improved arrangement for logical circuits employing magnetic cores.

Still another object of this invention is to provide a plurality of magnetic storage means which are unequally interrogated to provide an output the magnitude of which is indicative of the residual flux density stored.

Yet another object of this invention is to provide a new and improved circuit utilizing magnetic elements to perform the logical operation of equals not requiring the use of diodes.

Other objects of this invention will be pointed out in the following description and claims and illustrated in the accompanying drawings, which disclose, by way of example, the principle of the invention and the best mode, which has been contemplated, of applying that principle.

Figure 1:
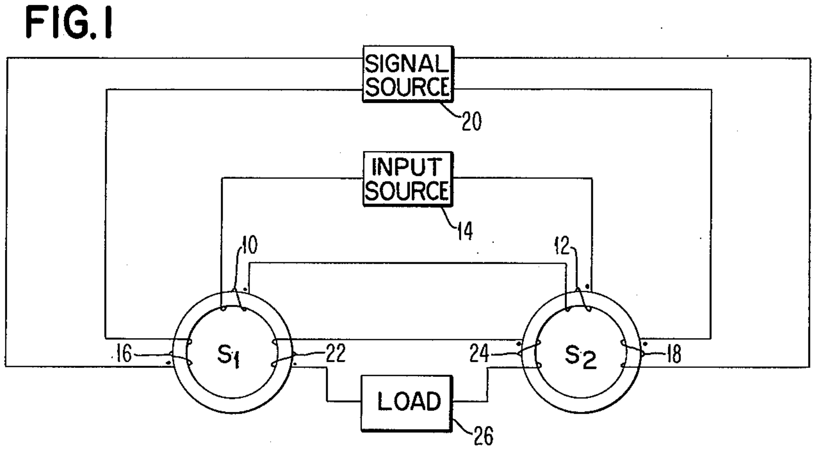
FIG. 1 is a circuit depicting one embodiment of this invention.
Figure 2:
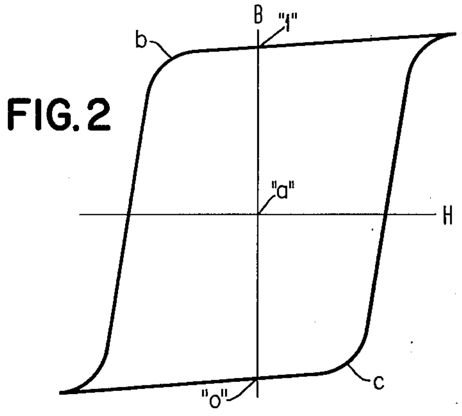
FIG. 2 is a representation of flux density (B) versus magnetic field (H) obtained for a material of the type employed.

Referring to FIG. 1, a core $S_1$ and a core $S_2$ are shown each of which is made of a material which exhibits a hysteresis characteristic such as shown in the FIG. 2. The curve illustrated in FIG. 2 has sharply defined knees "*b*" and "*c*" and opposite remanence states which are conventionally employed for representing binary information conditions, arbitrarily designated as "0" and "1." With a "0" stored, a pulse applied to a winding linking the core in proper sense causes the loop to be traversed and the remanence state "1" is attained when the pulse terminates. Such a pulse is hereinafter referred to as a "write" pulse. Similarly, the core is reset or returned to the "0" state in determining what information has been stored by applying a pulse in the reverse sense to the same or another winding. Such a pulse is hereinafter referred to as a "read" pulse. Accordingly, the points "*b*" and "*c*" are defined as the read and write threshold, respectively. Should a "1" have been stored, a large flux change occurs with a shift from "1" to "0" states with a corresponding voltage magnitude developed on an output winding. On the other hand, should a "0" have been stored, little flux change occurs and negligible signal is developed on the output winding.

For any given core, to attain either the "1" or the "0" limiting state, as described above, a given amount of flux change must occur within the core. Assume, however, that instead of a volt-time product applied to a given core which is sufficient to fully switch the core to one of the limiting states, only half this given volt-time product is applied. Since only half the given volt-time product is applied, only half the amount of flux change will occur within the core and subsequent to the application of such a signal, the core will attain a "mid-way," or "half-state" of residual flux density which is shown by the point "*a*" in the FIG. 2. Similarly then, different increments of volt-time product applied will result in different residual states of flux density intermediate the "1" and "0" limiting states.

Referring to FIG. 1, the cores $S_1$ and $S_2$ are each provided with winding means having a plurality of windings wherein an input winding 10 is provided on the core $S_1$ connected with an input winding 12 on the core $S_2$ and a signal input means 14. A further winding 16 on the core $S_1$ and a further winding 18 on the core $S_2$ is provided, each connected with a signal source 20. An output winding 22 is provided on the core $S_1$ series connected with an output winding 24 on the core $S_2$ and a load 26. A dot is shown adjacent one terminal of each of the aforementioned windings and also the windings in FIG. 3 as will be described hereafter indicating its winding direction. A "write" pulse is a positive pulse directed into the undotted end of the winding terminal which tends to store a "1," while a "read" pulse is a positive pulse directed into the dotted end of the winding terminal and tends to apply a negative magnemotive force or store a "0."

Consider, initially, that all the cores are at the "0" state of lower remanence condition "0" shown in FIG. 2.

Assume the signal input means 14 delivers a positive voltage pulse directed into the undotted end of the winding 10 and 12 on the cores $S_1$ and $S_2$, respectively, which, because the cores are similar and have the same number of winding turns thereon, will share the available volt-time product. If the volt-time product available is sufficient to switch both of the cores, each will assume the "1" state at the termination of the signal. However, should the signal applied be less than the volt-time product necessary to fully switch both of the cores $S_1$ and $S_2$ to the "1" state, the residual flux density of each of the cores, upon termination of the input signal, will assume an intermediate position between the two limiting states such as point "$a$" in FIG. 2. Subsequent to the initial input signal assume a first pulse from the signal source 20 is directed into the windings 16 and 18 in such a manner as to read the core $S_1$ and write the core $S_2$. The core $S_1$ will then be resent toward the "0" state while the core $S_2$ will be switched toward the "1" state. Accordingly, an output voltage is developed in each of the windings 22 and 24 on the cores $S_1$ and $S_2$, respectively, which windings are connected in opposing sense, and the algebraic sum of the induced voltage output realized is then indicative of the information stored in the cores. For example, assume the input signal were such that each of the cores $S_1$ and $S_2$ remained in the "0" state. Upon application of the first pulse from the signal source 20 into the windings 16 and 18, the core $S_1$ is driven further into the "0" direction of saturation, while the core $S_2$ is fully switched toward the "1" state. The core $S_2$, in switching, induces a voltage in the output winding 24 with the undotted end positive, causing a clockwise current flow which tends to read the core $S_1$. Since the core $S_1$ is already in the "0" state, it appears as a small impedance and the total output voltage induced in the output winding 24 is then available to the load 26. If the initial input from the signal source 14 were such as to switch each of the cores to the "half-state" or point "$a$" in the FIG. 2, upon application of the first pulse from the signal source, 20, the core $S_1$ would switch from the "half-state" toward the "0" state to induce a voltage in the winding 22 with the dotted end positive. The core $S_2$ would switch from the "half-state" toward the "1" state and in so doing induce a voltage in the winding 24 with the undotted end positive. The induced voltages effectively cancel, and negligible current flows in the loop. It then follows that if the cores $S_1$ and $S_2$ were initially switched to the "1" state and subsequently pulsed to read and write, respectively, the core $S_1$ induces an output voltage in the winding 22, with the dotted end positive, while the core $S_2$ is driven further into saturation. After the input signal from the source 14 and the first pulse from the signal source 20, a second pulse from the source 20 is delivered into the windings 16 and 18 on the cores $S_1$ and $S_2$, respectively, which resets the cores to the "0" state. It should be understood that further cores may be added to allow further subdivision, or sharing of a given signal, or the amount of signal may be varied to accomplish the logic desired. Further, since a voltage will be induced in each of the output windings 22 and 24 whenever there is a flux change within the cores $S_1$ and $S_2$, the time at which an output is recognized may be provided by proper timing controls on the load 26.

Figure 3:
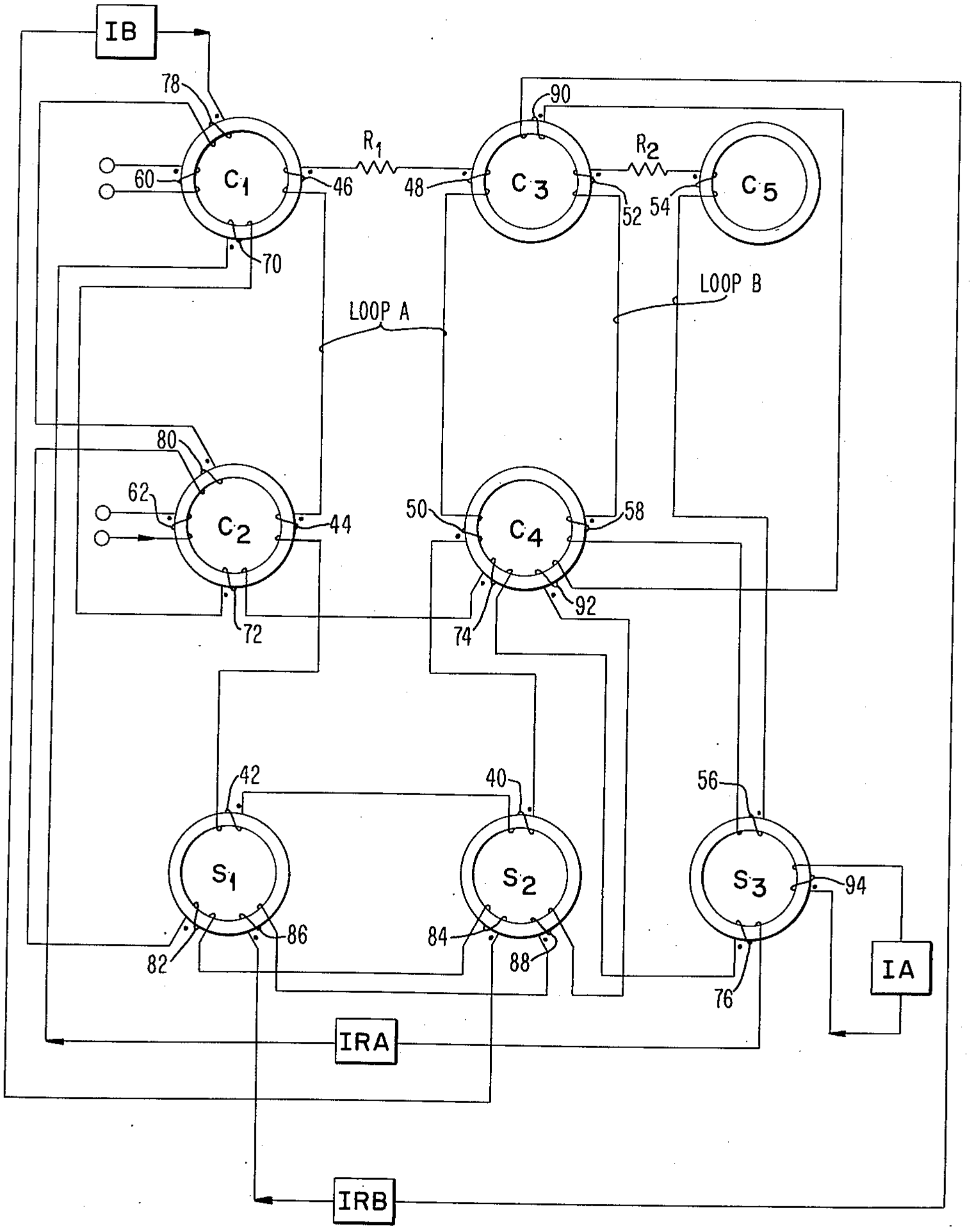
FIG. 3 is a circuit diagram of a magnetic core two-way equals circuit depicting another embodiment of this invention.

Referring now to the FIG. 3, interconnecting coupling cores are arranged intermediate to the so-called storage magnetic cores which are adapted to be interconnected with each other, and with similar type circuitry through such coupling cores. The coupling cores may be fabricated of ferrite material, like the storage cores; however, it is not essential that these cores exhibit the rectangular hysteresis characteristic required of the storage or memory cores, as these devices function as variable impedance elements in controlling the transfer of information pulses; however, they do require a good Br/Bs ratio, as will be more evident from the following description. Such interconnecting coupling cores are illustrated in the circuit which are labeled $C_1$, $C_2$, $C_3$, $C_4$ and $C_5$ for clarity. Also shown are three storage cores $S_1$, $S_2$ and $S_3$ which are adapted to store information received. The cores $S_1$ and $S_2$ are adapted to function similarly as described above and deliver information to the storage core $S_3$.

The core $S_2$ is provided with a winding 40 interconected with a winding 42 on the core $S_1$, an output winding 44 on the core $C_2$ , an output winding 46 on the core $C_1$, an input winding 48 on the core $C_3$, through a resistor $R_1$ and an input winding 50 on the core $C_4$ which interconnection is hereinafter referred to as loop A. The core $C_3$ is further provided with an output winding 52 interconnected with an input winding 54 on the core $C_5$ through a resistor $R_2$, a winding 56 on the core $S_3$ and an output winding 58 on the core $C_4$ which interconnection is hereinafter referred to as loop B. Input signals are applied to the cores $C_1$ and $C_2$ by means of input windings 60 and 62, respectively, and information designating the logical function of equals is realized when the core $S_3$ is switched to the "1" state during the operation of the circuit.

The coupling cores $C_1$, $C_2$ and $C_4$, along with the storage core $S_3$ are energized from a clock pulse source $I_{RA}$ while the coupling cores $C_1$ and $C_2$ along with the storage cores $S_1$ and $S_2$ are energized from a clock pulse source $I_B$. The coupling cores $C_3$ and $C_4$ along with the storage cores $S_1$ and $S_2$ are energized from a clock pulse source $I_{RB}$ and the storage core $S_3$ is further energized from a clock pulse source $I_A$. A winding 70 is provided on the core $C_1$, a winding 72 on the core $C_2$, a winding 74 on the core $C_4$ and a winding 76 on the core $S_3$, which windings are connected with the clock pulse source $I_{RA}$. Similarly, in winding 78 is provided on the core $C_1$, a winding 80 on the core $C_2$, a winding 82 on the core $S_1$ and a winding 84 on the core $S_2$, which windings are connected with the clock pulse source $I_B$. A further winding 86 is provided on the core $S_1$, a winding 88 on the core $S_2$, a winding 90 on the core $C_3$, a winding 92 on the core $C_4$, which windings are interconnected with the clock pulse source $I_{RB}$, while a winding 94 on the core $S_3$ is conected with the clock pulse source $I_A$.

In the equals circuit illustrated in the FIG. 3 and described above, it may be observed that the winding 42 on the core $S_1$ performs the functions of the windings 10 and 22 in the FIG. 1, while similarly the winding 40 on the core $S_2$ in the FIG. 3 performs the functions of the windings 12 and 24 in the FIG. 1. This will become more evident in the detailed description to follow.

Figure 4:
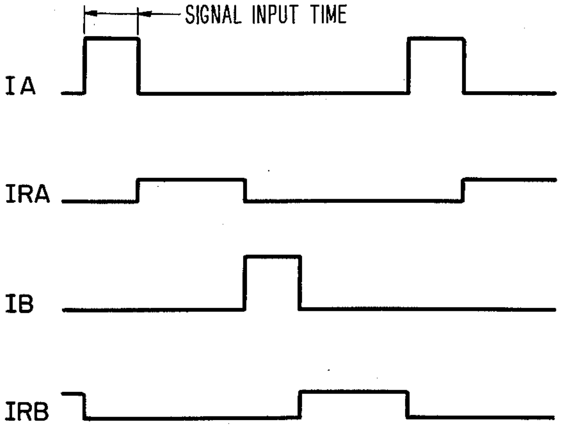
FIG. 4 illustrates the relative timing of current pulses which are required for the operation of the circuit in FIG. 3.

The sequence of pulses provided by the several clock pulse sources described above is indicated in FIG. 4. An input, as hereinafter referred to, is a positive pulse which is directed into the undotted end of an input winding, the time of appearance being the time at which the $I_A$ clock pulse appears as further indicated in the FIG. 4.

With all cores initially in the lower remanence, or "0" state, assume an absence of input to the circuit. The $I_A$ clock pulse source directs a read signal into the winding 94 on the core $S_3$ which has no effect since the core is already in the "0" state. The $I_{RA}$ clock pulse source thereafter directs a read signal into the windings 70, 72, 74 and 76 on the cores $C_1$, $C_2$, $C_4$, and $S_3$, respectively, which similarly has no effect. Subsequently, the $I_B$ clock pulse source directs a signal into the windings 78, 80 and 82 tending to read each of the cores $C_1$, $C_2$ and $S_1$, respectively, while coincidently directing a write signal into the winding 84 on the core $S_2$. Only the core $S_2$ is affected and switches from the "0" toward the "1" state to induce a voltage in the winding 40 with the undotted end positive causing a clockwise current in the loop A. The clockwise current in loop A tends to read the cores $S_1$, and $C_3$, while tending to write the cores $C_2$, $C_1$ and $C_4$. Since each of the cores $S_1$ and $C_3$ are already in the "0" state, they are unaffected, while the cores $C_2$ and $C_1$ are held in the "0" state by virtue of the $I_B$ drive in their windings 80 and 78, respectively. Accordingly, the core $C_4$ is switched from the "0" toward the "1" state to induce a voltage in the output winding 58 with the undotted end positive causing a counter-clockwise current in the loop B which fully switches the core $S_3$ from the "0" to the "1" state. At the tremination of the $I_B$ clock pulse, the cores $S_2$, $C_4$ and $S_3$ are left in the "1" state while the remaining cores are left in the "0" state. Subsequently, the $I_{RB}$ clock pulse directs a read signal into the windings 86, 88, 90 and 92 on the cores $S_1$, $S_2$, $C_3$ and $C_4$, respectively, which switches the cores $S_2$ and $C_4$ from the "1" toward the "0" state. The cores $S_2$ and $C_4$ in switching induce a voltage in the windings 40, 50, and 58 with the dotted end positive. The induced voltage in the winding 58 is such as to cause a clockwise current in loop B which tends to write the core $C_3$ and read the cores $C_5$ and $S_3$. The core $C_5$ is already in the "0" state, while the core $C_3$ is held in the "0" state by the $I_{RB}$ drive in the winding 90 at this time, leaving a possibility of switching the core $S_3$ from the "1" to the "0" state. The resetting of the core $C_4$ is done slowly so as not to exceed threshold for the core $S_3$, thus having no deleterious effects in loop B. The induced voltage in the winding 40 is greater than the induced voltage in the winding 50 because of the greater number of turns in the winding 40. The algebraic sum of the induced voltages in the windings 40 and 50 is seen to be such as to allow a counter-clockwise current flow in the loop A. This small counter-clockwise current in loop A tends to write the cores $C_3$ and $S_1$ and tends to read the cores $C_1$ and $C_2$. Since the cores $C_1$ and $C_2$ are already in the "0" state and the cores $C_3$ and $S_1$ are held in the "0" state by the $I_{RB}$ drive to the windings 90 and 86, respectively, all cores are left in the "0" state at the termination of the $I_{RB}$ clock pulse. Operation, wherein no signal input is delivered to the circuit, has provided a signal output and all cores in the loop A have been returned to the "0" state readying the circuit for the next cycle of operation.

In the next cycle of operation, assume an input is directed into the winding 62 on the core $C_2$ which switches the core $C_2$ from the "0" to the "1" state. Coincidently, the $I_A$ clock pulse source directs a read signal into the winding 94 on the core $S_3$ which switches the core $S_3$, which was previously left in the "1" state, toward the "0" state. The core $S_3$ in switching induces a voltage on the winding 56 with the dotted end positive causing a counter-clockwise current in the loop B which tends to switch the core $C_5$ to the "1" state and the cores $C_3$ and $C_4$ to the "0" state. Since the cores $C_3$ and $C_4$ are already in the "0" state, the core $C_5$ is switched to the "1" state to generate a signal input to another logical circuit. The core $C_2$ in switching to the "1" state induces a voltage in the output winding 44 with the undotted end positive causing a counter-clockwise current in the loop A which tends to write the cores $S_1$, $S_2$ and $C_3$ while tending to read the cores $C_4$ and $C_1$. Since the cores $C_4$ and $C_1$ are already in the "0" state, they are unaffected. The cores $S_1$ and $S_2$ having an equal number of turns in their windings 42 and 40, respectively, and in comparison having a greater number of turns than the winding 48 on the core $C_3$, each of the cores $S_1$ and $S_2$ start switching toward the "1" state. Since the volt-time product which is available at this time is equal to one core switching and each of the cores $S_1$ and $S_2$ share this volt-time product, the cores switch to the mid-way residual state or point "*a*" as shown in the FIG. 2. At the termination of the $I_A$ clock pulse and the input pulse, the cores $S_1$ and $S_2$ are left in their "half-state," while the core $C_2$ is left in the "1" state. The $I_{RA}$ clock pulse source then directs a read signal into the windings 70, 72, 74 and 76, on the cores $C_1$, $C_2$, $C_4$ and $S_3$, respectively. The core $C_2$ is then switched from the "1" toward the "0" state to induce a voltage in the output winding 44 with the dotted end positive causing a clockwise current in the loop A. This clockwise current in loop A tends to write the core $C_1$, read the core $C_3$, write the core $C_4$, and read each of the cores $S_2$ and $S_1$. Since the core $C_3$ is already in the "0" state it is unaffected, while the cores $C_1$ and $C_4$ are held in the "0" state by virtue of the $I_{RA}$ drive in their windings 70 and 74, respectively. Again, this would normally allow switching of the cores $S_2$ and $S_1$ to the "0" state, so resetting is done slowly as not to exceed their read threshold. Subsequently, the $I_B$ clock pulse source directs a signal into the windings 78, 80, 82 and 84 on the cores $C_1$, $C_2$, $S_1$ and $S_2$ respectively which tends to read the cores $C_1$, $C_2$ and $S_1$ while tending to write the core $S_2$. The core $S_1$ is then switched from the point "*a*" to the "0" state to induce a voltage in the winding 42 with the dotted end positive, while the core $S_2$ is switched from the point "*a*" to the "1" state to induce a voltage in the winding 40 with the undotted end positive. The induced voltages are effectively equal and opposite and therefore cancel to allow negligible current flow in the loop A.

Subsequently, the $I_{RB}$ clock pulse directs a read signal into the windings 86, 88, 90 and 92 on the cores $S_1$, $S_2$, $C_3$ and $C_4$, respectively, which switches the core $S_2$ from the "1" toward the "0" state. The core $S_2$ in switching induces a voltage in the winding 40 with the dotted end positive causing a counter-clockwise current in the loop A which tends to read the cores $C_4$, $C_1$ and $C_2$ while tending to write the cores $C_3$ and $S_1$. The $I_{RB}$ drive in the windings 86 and 90 hold the cores $S_1$ and $C_3$, respectively, in the "0" state, while the cores $C_4$, $C_1$ and $C_2$ are already in the "0" state so they too are unaffected. Then where an input is provided to one of the two possible input terminals, inequality existing, an absence of output is provided. It should also be noted that if an input were provided to the core $C_1$ alone, again indicating inequality, the circuit operates similarly and again there is an absence of an output signal.

In the next cycle of operation, assume an input is directed into the windings 60 and 62 on the cores $C_1$ and $C_2$, respectively, which switches the cores $C_1$ and $C_2$ from the "0" to the "1" state. Coincidently, the $I_A$ clock pulse directs a read signal into the winding 94 on the core $S_3$ which has no effect since the core $S_3$ was previously left in the "0" state. The cores $C_1$ and $C_2$ in switching towards the "1" state, induce a voltage in their windings 46 and 44, respectively, with the undotted end positive causing a counter-clockwise current in the loop A which tends to write the cores $S_1$, $S_2$ and $C_3$ while tending to read the core $C_4$. As described above, since the number of turns in the windings 42 and 40 on the cores $S_1$ and $S_2$ are greater than the number of turns in the winding 48 on the core $C_3$, the cores $S_1$ and $S_2$ start switching from the "0" toward the "1" state. Since the available volt-time product is equivalent to two cores switching, each of the cores $S_1$ and $S_2$ are fully switched to the "1" state. At the termination of the $I_A$ clock pulse source, the cores $C_1$, $C_2$, $S_1$ and $S_2$ are left in the "1" state. The $I_{RA}$ clock pulse source then directs a read signal into the windings 70, 72, 74 and 76 on the cores $C_1$, $C_2$, $C_4$, and $S_3$, respectively, switching the cores $C_1$ and $C_2$ from the "1" toward the "0" state to induce a voltage in the windings 46 and 44, respectively, causing a clockwise current in the loop A. This clockwise current tends to read the core $C_3$, write the core $C_4$ and read the cores $S_1$ and $S_2$. Again, since the core $C_3$ is already in the "0" state, and the core $C_4$ is held in the "0" state by virtue of the $I_{RA}$ drive in the winding 74, the cores remain in their respective states since switching by the $I_{RA}$ clock pulse is done slowly so as not to exceed the read threshold for the cores $S_1$ and $S_2$. Subsequently, the $I_B$ clock pulse source directs a signal into the windings 78, 80, 82 and 84 on the cores $C_1$, $C_2$, $S_1$ and $S_2$, respectively, which tends to read the cores $C_1$, $C_2$, and $S_1$ while tending to write the core $S_2$. The cores $C_1$ and $C_2$ are already in the "0" state while the core $S_2$ is already in the "1" state to allow negligible flux change. The core $S_1$ is switched from the "1" toward the "0" state to induce a voltage in the winding 42 with the dotted end positive causing a counter-clockwise current in the loop A. This counter-clockwise current tends to read the cores $C_4$, $C_1$ and $C_2$ while tending to write the cores $S_2$ and $C_3$. Since the cores $C_1$, $C_2$ and $C_4$ are already in the "0" state, while the core $S_2$ is already in the "1" state, the core $C_3$ is switched from the "0" toward the "1" state. The core $C_3$ in switching from the "0" toward the "1" state induces a voltage in the winding 52 with the undotted end positive causing a counter-clockwise current in the loop B which writes the core $S_3$. At the termination of the $I_B$ clock pulse, the cores $S_2$, $C_3$ and $S_3$ are left in the "1" state while the remaining cores are left in the "0" state. The $I_{RB}$ clock pulse source directs a read signal into the windings 86, 88, 90 and 92 on the cores $S_1$, $S_2$, $C_3$ and $C_4$, respectively. The cores $S_2$ and $C_3$ are switched from the "1" toward the "0" state to induce a voltage in their windings 40, 48 and 52 with the dotted end positive causing a counter-clockwise current in loop A and a clockwise current in loop B. The clockwise current in loop B tends to read the cores $C_5$ and $S_3$ and write the core $C_4$. Since the core $C_5$ is already in the "0" state and the core $C_4$ is held in the "0" state by virtue of the $I_{RB}$ drive in the winding 92, and resetting of the core $C_3$ is done slowly so the resulting current in loop B does not exceed read threshold for the core $S_3$, these cores are unaffected. The counter-clockwise current in loop A tends to read the cores $C_1$, $C_2$ and $C_4$ while tending to write the core $S_1$. Since the cores $S_1$ and $C_4$ are held in the "0" state by virtue of the $I_{RB}$ drive in their windings 86 and 92, respectively, and the cores $C_1$ and $C_2$ are already in the "0" state, no change takes place, leaving all the cores in the "0" state and readying the circuit for the next cycle of operation. Thus, for an equivalence of input, here the presence of both input variables, an output is provided and the function of equivalence is realized.

It may be pointed out that the coupling cores like the storage cores may be of square loop magnetic material and in such instances a bias current may be provided to a further winding inductively associated with each of them individually which biases the cores toward their positive threshold (write "1" direction) in speeding up the operation of the system.

In the interest of providing a complete disclosure details of one embodiment of the equals device wherein ferrite cores are employed is given below, however, it is to be understood that other component values and current magnitudes may be employed with satisfactory operation attained so that the values given should not be considered limiting.

With the clock pulse source $I_A$ delivering a constant current of 1.5 amperes, the winding 94 may comprise five turns. With the clock pulse source $I_B$ delivering a constant current of 2.7 amperes, the windings 78 and 80 may comprise two turns, the winding 82 may comprise six turns and the winding 84 may comprise five turns. With the clock pulse source $I_{RA}$ delivering a constant current of 0.560 ampere, the windings, 70 and 72 may comprise two turns. With the clock pulse source $I_{RB}$ delivering a constant current of 0.460 ampere, the windings 88 and 90 may comprise five turns, the winding 92 may comprise four turns and the winding 86 may comprise three turns. In the coupling circuits interconnecting the storage and coupling cores, the windings 44, 46, 52 and 58 may comprise twelve turns, the windings 40, 42 and 56 may comprise ten turns and the windings 48, 50 and 54 may comprise five turns, with the input windings 60 and 62 comprising five turns and the resistor $R_1$ of 5 ohms and the resistor $R_2$ of 8 ohms.

In this particular embodiment a bias current of 0.50 ampere may be applied to a one turn winding on each core where each of the storage and coupling cores comprise toroids of magnesium-manganese ferrite composition having an outside diameter of 0.100 inch, inside diameter of 0.070 inch and thickeness of 0.120 inch. This thickness may be obtained by stacking four cores each of 0.30 inch thickness and winding the stack as a single core unit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a binary information handling system, an

"Equals" circuit comprising a first and a second magnetic storage core; control winding means on each of said storage cores; a first and a second input coupling core; a first and a second output coupling core; input and output winding means on each of said coupling cores; circuit means including a series resistor connecting the output winding means on each of said input coupling cores with the control winding means on each of said storage cores and said input winding means on each of said output coupling cores; a first, a second and a third clock pulse source adapted to deliver a series of pulses in sequence displaced in time; separate winding means on each of said input coupling cores and said second output coupling core connected with said first clock pulse source so as to cause each of said input coupling cores and said second output coupling core to shift to a datum residual state when energized; further winding means on each of said input coupling cores and each of said first and second storage cores connected with said second clock pulse source so as to cause each of said input coupling cores and said first storage core to shift to the datum residual state and said second storage core to shift to an opposite residual state when energized; and additional winding means on each of said storage cores and each of said output coupling cores connected with said third clock pulse source so as to cause each of the storage cores and each of the output coupling cores to shift to the datum residual state when energized.

2. A magnetic "Equals" circuit comprising a first and a second magnetic storage core each capable of assuming alternate stable residual magnetic states representing binary information and having a switching threshold; control winding means on each of said storage cores; a first and a second input coupling core; a first and a second output coupling core; input and output winding means on each of said coupling cores; circuit means connecting the output winding means on each of said input cores with the control winding means on each of said storage cores and the input winding means on each of said output coupling cores; shift winding means on each of said input coupling cores and said second output coupling core adapted to be energized simultaneously and drive said input coupling cores and said second output coupling core toward a datum residual state; shift winding means on each of the input coupling cores and the first and second storage cores adapted to be energized simultaneously and to drive each of the input coupling cores and the first storage core toward the datum residual state and the second storage core toward an opposite residual state; and further shift winding means on each of said storage cores and each of said output coupling cores adapted to be energized simultaneously and to drive each of the storage cores and each of the output coupling cores toward the datum residual state.

3. A magnetic core "Equals" circuit comprising a first and second magnetic storage core; control winding means on each of said storage cores; a first and a second input coupling core; a first and a second output coupling core; input and output winding means on each of said coupling cores; circuit means connecting the output winding means on each of said input coupling cores with the control winding means on each of said storage cores and the input winding means on each of said output coupling cores; shift winding means on said first input coupling core series connected with shift winding means on said second input coupling core and shift winding means on said second output coupling core adapted to drive each of said input coupling cores and said second output coupling core toward a datum residual state when energized by a first clock pulse source; shift winding means on said first input coupling core series connected with shift winding means on each of said first and second storage cores and shift winding means on said second input coupling core adapted to drive each of said first and second input coupling cores and said first storage core toward the datum residual state and said second storage core toward an opposite residual state when energized by a second clock pulse source; and shift winding means on said first storage core series connected with shift winding means on said second storage core and shift winding means on said output coupling cores adapted to drive each of the storage cores and each of the output coupling cores toward the datum residual state when energized by a third clock pulse.

4. A magnetic core "Equals" circuit comprising a first and a second magnetic storage core; control winding means on each of said storage cores; a first and a second input coupling core; a first and a second output coupling core; input and output winding means on each of said coupling cores; circuit means connecting the output winding means on each of said input coupling cores with the control winding means on each of said storage cores and the input winding means on each of said output coupling cores; shift winding means on said first input coupling core series connected with shift winding means on said second input coupling core and shift winding means on said second output coupling core adapted to drive each of the input coupling cores and the second output coupling core toward a datum residual state when energized from a first clock pulse source; shift winding means on said first input coupling core series connected with shift winding means on said second input coupling core and shift winding means on each of said first and second storage cores adapted to drive each of the input coupling cores and the first storage core toward the datum residual state and the second storage core toward an opposite residual state when energized from a second clock pulse source; shift winding means on said first storage core series connected with shift winding means on said second storage core and said first and second output coupling cores adapted to drive each of said storage cores and said output coupling cores toward the datum residual state when energized from a third clock pulse source; and means for biasing at least said storage magnetic cores toward the opposite residual state.

5. A magnetic core "Equals" circuit comprising a first and a second magnetic storage core; control winding means on each of said storage cores; a first and a second input coupling core, a first and a second output coupling core; input and output winding means on each of said coupling cores; circuit means connecting the output winding means on each of said input coupling cores with the control winding means on each of said storage cores and the input winding means on each of said output coupling cores; shift winding means on said first input coupling cores series connected with shift winding means on said second input coupling core and shift winding means on said second output coupling core adapted to drive the input coupling cores and the second output coupling core toward a datum residual state when energized from a first clock pulse source; shift winding means on said first input coupling core series connected with shift winding means on each of said first and second storage cores and shift winding means on said second input coupling core adapted to drive the input coupling cores and the first storage core toward the datum residual state and the second storage core toward an opposite residual state when energized from a second clock pulse source; shift winding means on said first storage core series connected with shift winding means on said second storage core and shift winding means on each of said output coupling cores adapted to drive the storage cores and the output coupling cores toward the datum residual state when energized from a third clock pulse source; and means for energizing said shift winding means including said first, second, and third clock pulse sources wherein said sources are actuated in sequence.

6. A magnetic core "Equals" circuit comprising a first and a second magnetic storage core; a first and a second input coupling core; a first and a second output coupling core; each of said cores being formed of a magnetic material having a substantially rectangular hysteresis characteristic with a switching threshold; control winding means on each of said storage cores; input and output winding means on each of said coupling cores; circuit means connecting the output winding means on each of said input coupling cores with the control windings on each of the storage cores and the input winding means on each of the output coupling cores; shift winding means on said first input coupling core series connected with shift winding means on said second input coupling core and shift winding means on said second output coupling core adapted to drive the input coupling cores and the second output coupling core toward a datum residual state when energized from a first clock pulse source; shift winding means on said first input coupling core series connected with shift winding means on each of said first and second storage cores and shift winding means on said second input coupling core adapted to drive each of the input coupling cores and the first storage core toward the datum residual state and the second storage core toward an opposite residual state when energized from a second clock pulse source; shift winding means on said first storage core series connected with shift winding means on said second storage core and shift winding means on each of said output coupling cores adapted to drive the storage cores and the output coupling cores toward the datum residual state when energized from a third clock pulse source; and means for biasing all of said cores toward the opposite residual state.

7. A magnetic core "Equals" circuit comprising a first and a second magnetic storage core; a first and a second input coupling core; a first and a second output coupling core; each of said cores being formed of a magnetic material having a substantially rectangular hysteresis characteristic with a switching threshold; control winding means on each of said storage cores; input and output winding means on each of said coupling cores; circuit means connecting the output winding means on each of said input coupling cores with the control winding means on each of the storage cores and the input winding means on each of the output coupling cores; shift winding means on said first input coupling core series connected with shift winding means on said second input coupling core and shift winding means on said second output coupling core adapted to drive each of the input coupling cores and the second output coupling core toward a datum residual state when energized from a first clock pulse source; shift winding means on said first input coupling core series connected with shift winding means on each of the first and second storage cores and shift winding means on said second input coupling core adapted to drive each of the input coupling cores and the first storage core toward the datum residual state and the second storage core toward an opposite residual state when energized from a second clock pulse source; shift winding means on said first storage core series connected with shift winding means on said second storage core and shift winding means on each of said output coupling cores adapted to drive the storage cores and the output coupling cores toward the datum residual state when energized from a third clock pulse source; means for biasing all of said cores toward the opposite residual state; and means for energizing said shift winding means including said first, second and third clock pulse sources wherein said sources are actuated in sequence in the order named.

8. A magnetic core "Equals" circuit comprising a first and a second magnetic storage core; a first and a second input coupling core; a first and a second output coupling core; each of said cores being formed of a magnetic material having a substantially rectangular hysteresis characteristic with a switching threshold; control winding means on each of said storage cores; input and output winding means on each of said coupling cores; circuit means including a resistor series connecting the output windings on each of said input coupling cores with the control winding means on each of the storage cores and the input winding means on each of the output coupling cores; shift winding means on said first input coupling core series connected with shift winding means on said second input coupling core and shift winding means on said second output coupling core adapted to drive each of said input coupling cores and said second output coupling core toward a datum residual state when energized from a first clock pulse source; further shift winding means on said first input coupling core series connected with shift winding means on each of said first and second storage cores and shift winding means on said second input coupling core adapted to drive each of the input coupling cores and the first storage core toward the datum residual state and the second storage core toward an opposite residual state when energized from a second clock pulse source; additional shift winding means on said first storage core series connected with shift winding means on said second storage core and shift winding means on each of said output coupling cores adapted to drive the storage cores and the output coupling cores toward the datum residual state when energized from a third clock pulse source; means for biasing all of said cores toward the opposite residual state; and means for energizing said shift winding means including said first, second and third clock pulse sources wherein said sources are actuated in sequence in the order named.

9. A circuit comprising first and second magnetic storage cores for conjointly storing information, each of said cores being capable of attaining stable states of remnant magnetization including first and second limiting states and an intermediate state substantially midway between said first and second limiting states, each of said cores having winding means thereon, information input means for selectively applying signals to at least a portion of each of said winding means to establish each of said cores in a first information representing state with each core in said first limiting state or to establish each of said cores in a second information representing state with each core in said intermediate state, readout means including at least a portion of each of said winding means actuable to establish said first core in said first limiting state and said second core in said second limiting state and output means including at least a given portion of each of said winding means for producing therein a resultant voltage equal to the difference between the output voltages developed across each of said given portions when said readout means is actuated, whereby a significant voltage output is produced when said readout means is actuated when said cores are in said first information representing state and the voltage produced in the output means is substantially zero when said readout means is actuated when said cores are in said second information representing state.

References Cited in the file of this patent

UNITED STATES PATENTS

| | | |
|---|---|---|
| 2,734,185 | Warren | Feb. 7, 1956 |
| 2,776,380 | Andrews | Jan. 1, 1957 |
| 2,801,344 | Lubkin | July 20, 1957 |
| 2,802,202 | Lanning | Aug. 6, 1957 |
| 2,835,881 | Wulfing | May 20, 1958 |
| 2,846,667 | Goodell et al. | Aug. 5, 1958 |
| 2,910,595 | Russell | Oct. 27, 1959 |

UNITED STATES PATENT OFFICE

CERTIFICATE OF CORRECTION

Patent No. 3,037,197

May 29, 1962

Newton F. Lockhart

It is hereby certified that error appears in the above numbered patent requiring correction and that the said Letters Patent should read as corrected below.

Column 1, line 31, after "having" strike out "a"; column 2, line 58, for "of" read -- or --; column 3, line 5, for "resent" read -- reset --; column 4, line 28, for "conected" read -- connected --; column 9, line 72, after "sequence" insert -- in the order named --.

Signed and sealed this 16th day of October 1962.

(SEAL)
Attest:

ERNEST W. SWIDER
Attesting Officer

DAVID L. LADD
Commissioner of Patents